United States Patent [19]

Heinkel

[11] Patent Number: 5,694,016
[45] Date of Patent: Dec. 2, 1997

[54] METHOD FOR CONTROLLING A SERVO SYSTEM HAVING FRICTION

[75] Inventor: Hans-Martin Heinkel, Stuttgart, Germany

[73] Assignee: Robert Bosch GmbH, Stuttgart, Germany

[21] Appl. No.: 735,953

[22] Filed: Oct. 23, 1996

Related U.S. Application Data

[63] Continuation of Ser. No. 842,398, Mar. 17, 1992, abandoned.

[30] Foreign Application Priority Data

Sep. 26, 1989 [DE] Germany .................. 39 32 061.8

[51] Int. Cl.$^6$ .................. G05B 5/01; G05D 3/12; F02D 41/30
[52] U.S. Cl. .................. 318/616; 318/631; 318/620
[58] Field of Search .................. 318/560–696, 318/699–823; 364/149–179

[56] References Cited

U.S. PATENT DOCUMENTS

| | | | |
|---|---|---|---|
| 2,410,289 | 10/1946 | Kellogg . | |
| 3,699,989 | 10/1972 | O'Connor et al. | 318/609 X |
| 3,819,999 | 6/1974 | Platt | 318/609 |
| 4,096,426 | 6/1978 | Tremaine et al. | 318/611 |
| 4,139,887 | 2/1979 | Levesque, Jr. | 318/609 X |
| 4,460,968 | 7/1984 | Cavill et al. | 318/561 X |
| 4,500,823 | 2/1985 | Walrath | 318/632 |
| 4,600,870 | 7/1986 | Martin | 318/610 |
| 4,673,031 | 6/1987 | Wiemer | 318/610 |
| 4,675,804 | 6/1987 | Wiemer | 318/609 |
| 4,727,303 | 2/1988 | Morse et al. | 318/616 |
| 4,749,928 | 6/1988 | Dautremay et al. | 318/610 |
| 4,890,046 | 12/1989 | Kurakake et al. | 318/630 |
| 5,079,493 | 1/1992 | Futami et al. | 318/640 |
| 5,089,761 | 2/1992 | Nakazawa | 318/811 |
| 5,093,609 | 3/1992 | Sakamoto et al. | 318/610 |
| 5,101,145 | 3/1992 | Rehm | 318/609 |
| 5,107,193 | 4/1992 | Iwashita | 318/560 |
| 5,119,005 | 6/1992 | Tsai et al. | 318/618 |
| 5,157,317 | 10/1992 | Coby | 318/632 |

FOREIGN PATENT DOCUMENTS

| | | |
|---|---|---|
| 0289626 | 11/1988 | European Pat. Off. . |
| 0290618 | 11/1988 | European Pat. Off. . |
| 1909627 | 9/1970 | Germany . |
| 2640080 | 3/1977 | Germany . |
| 3042917 | 8/1982 | Germany . |
| 744630 | 2/1956 | United Kingdom . |

OTHER PUBLICATIONS

Intoduction to Control Technology Chapter: Time–Optimised Controller W. Leonhard.
Nonlinear Feedforward Can Reduce Servo Settling Time, Mar. 1978, R. Palmer, IBM, General Products Div.
Nichtlineare Regelungen I, 1978, O. Föllinger.

*Primary Examiner*—Paul Ip
*Attorney, Agent, or Firm*—Spencer & Frank

[57] ABSTRACT

A method for controlling a servo system (10) having friction, in which the non-linear characteristic (20) of the position controller (12) is defined such that the magnitude of the variable Ns, Vs supplied to the servo system (10) having friction in the case of a control deviation Δx lying outside a predeterminable target region (21) produces a torque or a force which is adequate to tear the servo system free of the stiction torque or stiction and such that the movement energy of the servo system (10) can be dissipated in the target region (21). The additional use of an integral component, which is preferably a function of the control deviation Δx, increases the steady state accuracy.

7 Claims, 1 Drawing Sheet

METHOD FOR CONTROLLING A SERVO SYSTEM HAVING FRICTION

This application is a Continuation of application Ser. No. 07/842,398, filed Mar. 17, 1992, now abandoned.

BACKGROUND OF THE INVENTION

The invention is based on a method for controlling a servo system having friction, of the generic type of the main claim. The reference book "Einführung in die Regelungstechnik" (Introduction to control technology), Chapter: Time-optimised controller, by Leonhard discloses the structure of a sub-time optimised cascade controller. As a non-linear amplifying element, the position controller of the cascade controller has a square root curve, derived from the time-optimised controller, having a linear region for small control deviations in order to avoid limit cycling. The high gain resulting from the required small signal dynamics, together with the sensor noise and the analog/digital converter noise, lead to an unacceptably high system load and noise development in the steady state.

The invention is based on the object of specifying a method for controlling a servo system having friction, which method, in conjunction with a time-optimised large signal response and a good small signal and interference signal response, leads to a low system load, particularly to a small position instability in the desired position.

SUMMARY OF THE INVENTION

The method according to the invention is equally suitable for rotating and linear movement servo systems. The system load and the noise development are significantly reduced by means of a non-linear characteristic of the position controller matched to the friction at small control deviations. The non-linear characteristic of the position controller is defined in such a manner that the value of the variable supplied to the servo system in the case of a control deviation which lies outside a predeterminable target region results in a force or a torque which is adequate to tear the servo system free of the stiction or stiction torque, the movement energy of the servo system being dissipated in the target region.

The method according to the invention is particularly suitable for implementation on a computer, since only one non-linear characteristic is specified which can be laid down, for example, in tabular form or can be represented as a functional relationship.

Advantageous developments and improvements of the method according to the invention result from the subclaims.

Particularly advantageous is the specification of a smaller gradient in this region, corresponding to small signal operation, in comparison with the adjacent large signal region. This measure permits timely braking of the servo system during the transition from large signal operation to small signal operation.

The additional use of an integral component in the position controller is also advantageous. In conjunction with the measure that the non-linear characteristic has a gradient deviating from zero inside the target region, the integral component ensures increased steady state accuracy.

One advantageous configuration provides for the variation of the integral component as a function of the control deviation, a reduction of the integral component to zero outside a predeterminable control deviation preferably being provided. By means of this measure, it is possible to optimise both the large signal response and the small signal response.

The method according to the invention is suitable for controlling any servo system having friction. The adjustment of the control rod of a diesel fuel injection pump and the adjustment of a motor vehicle suspension are named here only by way of example.

The method according to the invention is explained in more detail on the basis of the description in conjunction with the drawing.

DESCRIPTION OF THE PREFERRED EMBODIMENT

Figure 1:
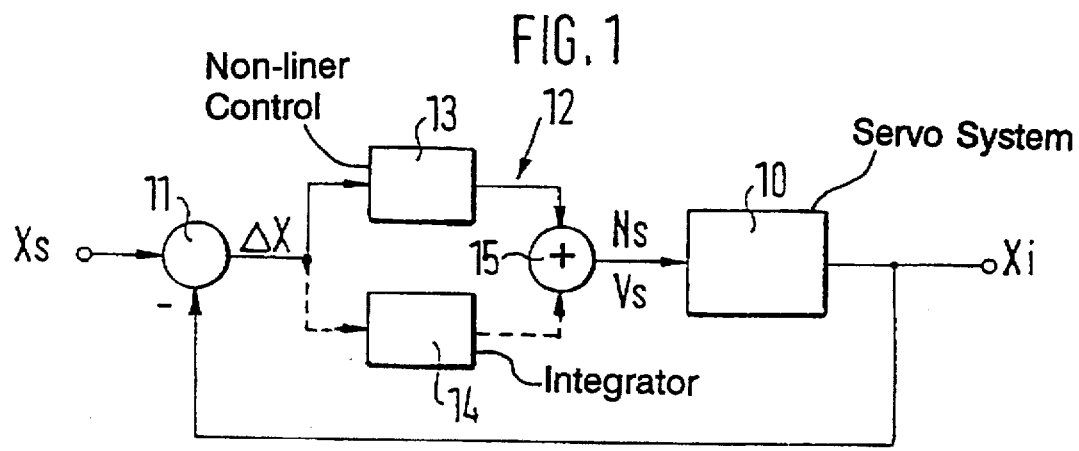
FIG. 1 shows a structure diagram of a control system with a servo system having friction.

The control system shown in FIG. 1 controls the output variable Xi, which corresponds to the actual position value of a servo system 10 having friction, as a function of a predetermined desired position value Xs. A differential device 11 determines a control deviation $\Delta x$, which is supplied to a position controller 12, from the desired position value Xs and the actual position value Xi. The position controller 12 contains a part 13 having a non-linear characteristic and a part 14 having an integral component. The outputs of the parts 13 and 14 are added in an adder 15 and are subsequently supplied to the servo system 10 as input variable Ns, Vs.

Figure 2:
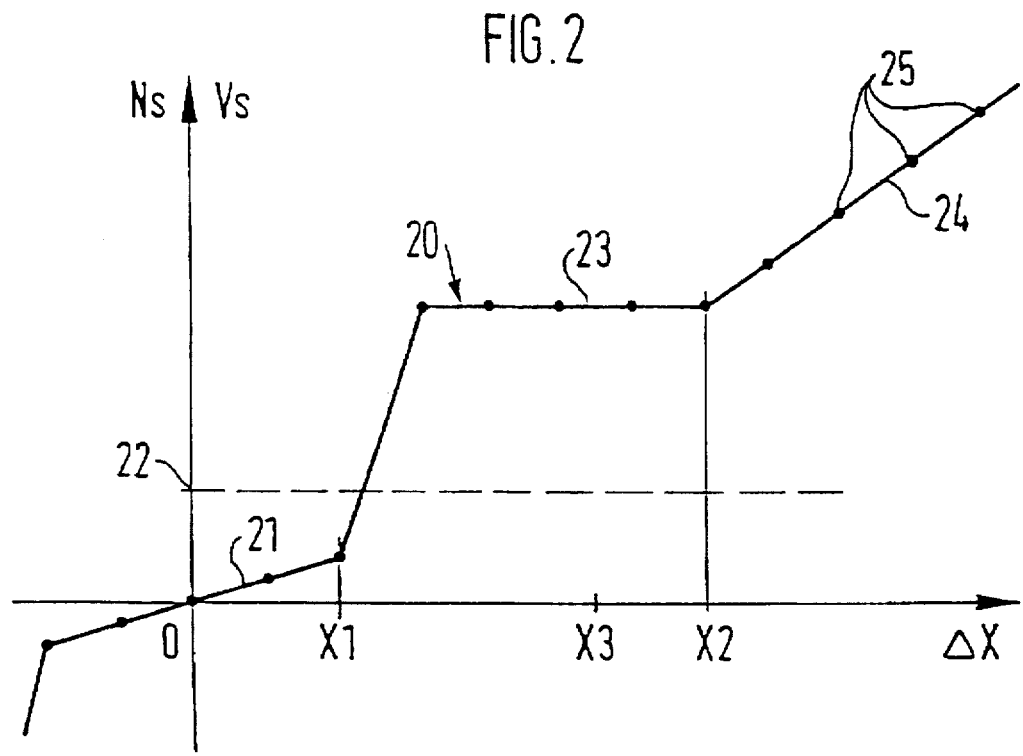
FIG. 2 shows a non-linear characteristic of a position controller and FIG. 3 shows a functional relationship between an integral component and a control deviation.

FIG. 2 shows a non-linear characteristic 20, which is contained in the part 13 of FIG. 1. The non-linear characteristic 20 produces a functional relationship between the control deviation $\Delta x$ and the input variable Ns, Vs of the servo system 10 having friction. The characteristic 20 is composed of at least three sections. Small control deviations $\Delta x$ lie within the target region 21|$\Delta X$|≤|X1|. In the target region 21, the value of the variables Ns, Vs lies below the value 22, which corresponds to the friction torque or the friction force of the servo system 10 having friction. This limit is shown as a dashed line in FIG. 2. Adjacent to the target region 21 is a second region |X1|<|$\Delta X$|≤|X2|. The values of the variable Ns, Vs lie above the limit 22 of the friction torque or of the friction force. In this region, the characteristic has a smaller gradient than in the third region 24, which is adjacent in the direction of larger control deviations |$\Delta X$|>|X2|. The region |$\Delta X$|≤|X2| can be designated the small signal region and the region |$\Delta X$|>|X2| can be designated the large signal region. To the extent that the controller 12 is implemented as software in a computer, discrete values 25 occur instead of the continuous characteristic 20.

Figure 3:
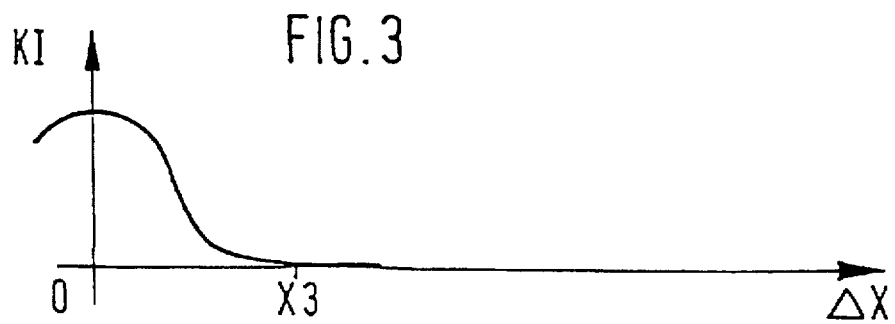

FIG. 3 shows a functional relationship between the control deviation $\Delta x$ and an integration factor KI of the integral component, which is contained in part 14 of the controller 12 in FIG. 1. The integration factor KI corresponds to the reciprocal of the time constant TI of an integrator. The integration factor KI depends on the control deviation $\Delta x$. Below a predeterminable limit |$\Delta X$|≤|X3|, KI increases to a specific value, and tends to zero for a control deviation |$\Delta X$|≤X3|.

The method according to the invention is explained in more detail on the basis of FIGS. 1 and 2: The control system shown in FIG. 1 contains the servo system 10 having friction, which is not described in more detail here.

The control variable Xi is a position which is intended to be matched to the new desired value Xs in the shortest possible time, for control deviations Δx. This method can relate to both rotating and linear movement servo systems. The input variable of a rotating system 10 is, for example, the specification of a specific servo rotation speed Ns, the input variable of a linear movement system 10 being, for exampler the specification of a servo speed Vs. Lower-level control loops, which are not described in more detail, are, for example, differential rotation speed and current controllers for the drive motor.

According to FIG. 2, the value for the variable Ns, Vs is determined on the basis of the predetermined non-linear characteristic 20, as a function of the control deviation Δx. Significant to the invention is the definition of the non-linear characteristic 20 in such a manner that the magnitude of the variable Ns, Vs in the case of a control deviation ΔX lying outside the predeterminable target region 21 produces a torque or a force which is adequate to tear the servo system 10 free of the stiction torque or stiction and such that the movement energy of the servo system 10 can be dissipated in the target region 21. For this purpose, it is necessary only to know the friction torque or the friction force of the servo system 10, which can be determined, for example, empirically. In FIG. 2, this value 22 is shown by a dashed line. The values for Ns, Vs inside the target region 21 lie below the value 22. To the extent that no integral component is provided in the position controller 12, the characteristic 20 has no gradient in the target region 21. Using this measure, the control system comes completely to rest inside the target region 21 and no energy is consumed.

In the second and third region 23, 24, the value of the variables Ns, Vs is dimensioned such that the movement energy of the servo system can be dissipated in the target region 21. In the second region 23, the non-linear characteristic 20 can have the gradient zero or a predeterminable value. The gradient in the second region 23 is preferably always smaller than the gradient in the third region 24. As a result of this measure, a braking region is created for the servo system 10, which ensures timely braking if the system 10 attempts to move from the third region 24, which corresponds to large signal operation, towards smaller control deviations Δx. Without the premature reduction in the gradient of the third region 24 in the second region 23, there would be a risk of overshooting.

The static, non-linear characteristic 20 of the position controller 12 can advantageously be supplemented by the part 14 in FIG. 1, which contains an integral component. The integral component increases the steady state accuracy. Particularly advantageous is the measure of specifying the integral component as a function of the control deviation Δx. The relationship between the control deviation Δx and the factor KI of tee integral component is shown in FIG. 3. The factor KI is the reciprocal of the time constant Ti of an integrator. The characteristic is preferably defined in such a manner that the maximum value of KI occurs when the control deviation Δx=zero, and control deviation Δx tends to zero above a predeterminable value |x3|. The limiting value |x3| lies, for example, in the small signal region |Δx|≦|x2|. A first possible position of the value |x3| is shown by way of example in FIG. 2. The value |x3| can, however, also lie at the start of the third region 24, which corresponds to large signal operation. The integral component, reduced to zero in this region, prevents unnecessary integration up to high values of Ns, Vs at large control deviations Δx.

The adder 15, which is necessary only if the part 14 is provided, adds the output values of the parts 13 and 14 and emits the values for the variable Ns, Vs as input variable to the servo system 10.

The complete position controller 12 thus contains only two characteristics, one integration and one summation and thus requires only a small computation time, to the extent that the method is implemented on a computer. If the integral component is dispensed with, one characteristic, the integration and the summation are omitted.

The method according to the invention is suitable for controlling all servo systems 10 having friction. The control rod of a diesel fuel injection pump and the control of a motor vehicle suspension are referred to here by way of example for such servo systems.

I claim:

1. Method for controlling a servo system having friction, with a non-linear position controller which determines a value of a control variable (Ns, Vs) supplied to the servo system; said method comprising:

combining an input control value corresponding to a desired position of the servo system with an output signal value corresponding to a current position of the servo system to form a control deviation value (Δx); and determining said control variable value as a function of said control deviation value (Δx), using a non-linear characteristic in the position controller defined such that the value of the control variable (Ns, Vs) when a control deviation value (Δx) which lies outside a predetermined target region within which the servo system is to come to rest is present, produces a torque or a force which is adequate to tear the servo system free of its stiction torque or stiction, and such that said value of said control variable (Ns, Vs) corresponds to a desired speed which produces a movement energy of the servo system which can be dissipated in the target region; and, wherein the non-linear characteristic, with increasing values of said control deviation value (Δx), has a second predetermined region which has a smaller gradient than in a third region.

2. Method for controlling a servo system having friction, with a non-linear position controller which determines a value of a control variable (Ns, Vs) supplied to the servo system; said method comprising:

combining an input control value corresponding to a desired position of the servo system with an output signal value corresponding to a current position of the servo system to form a control deviation value (Δx); and determining said control variable value as a function of said control deviation value (Δx), using a non-linear characteristic in the position controller defined such that the value of the control variable (Ns, Vs) when a control deviation value (Δx) which lies outside a predetermined target region within which the servo system is to come to rest is present, produces a torque or a force which is adequate to tear the servo system free of its stiction torque or stiction, and such that said value of said control variable (Ns, Vs) corresponds to a desired speed which produces a movement energy of the servo system which can be dissipated in the target region; and, wherein the position controller contains an integrating component and said step of determining includes integrating the control deviation value (Δx) and adding same to the value of the control variable determined as a function of the control deviation value prior to supplying the variable value to the servo system.

3. Method according to claim 2, wherein the non-linear characteristic has a gradient which deviates from zero in the target region.

4. Method according to claim 2, wherein the integrating component is varied as a function of the control deviation $|\Delta x|$.

5. Method according to claim 4, wherein the integrating component is reduced to zero outside a predetermined control deviation value $|\Delta x| \leq |X3|$, where X3 is a value outside of said target region.

6. Method for controlling a servo system having friction, with a non-linear position controller which determines a value of a control variable (Ns, Vs) supplied to the servo system; said method comprising:

combining an input control value corresponding to a desired position of the servo system with an output signal value corresponding to a current position of the servo system to form a control deviation value ($\Delta x$); and determining said control variable value as a function of said control deviation value ($\Delta x$) using a non-linear, non-integrated characteristic in the position controller, with this characteristic being defined such that the value of the control variable (Ns, Vs) when a control deviation value ($\Delta x$) which lies outside a predetermined target region within which the servo system is to come to rest is present, produces a torque or a force which is adequate to tear the servo system free of its stiction torque or stiction, and such that said value of said control variable (Ns, Vs) corresponds to a desired speed which produces a movement energy of the servo system which can be dissipated in the target region to cause the servo system to come to rest within the target region.

7. Method according to claim 6, used for control of a control rod of a diesel fuel injection pump or control of a motor vehicle suspension.

* * * * *